Patented Apr. 18, 1933

1,904,909

UNITED STATES PATENT OFFICE

ORIE E. WASSON, OF YOUNGSTOWN, OHIO, ASSIGNOR TO THE BESSEMER CEMENT CORPORATION, OF YOUNGSTOWN, OHIO, A CORPORATION OF OHIO

MORTAR CEMENT

No Drawing.   Application filed January 21, 1931.  Serial No. 510,319.

This invention relates to a cement composition having hydraulic properties, and more particularly to a mortar cement containing as essential ingredients slag, cement clinker and shale.

I have discovered that raw shale may be included in a slag cement composition with beneficial results and without destroying the hydraulic characteristics of the mixture if certain conditions are followed. I prefer to employ a shale because of its definitely lower water ratio in comparison with clays, etc., and to grind the total mix to a fineness exceeding 95% passing through a 200 mesh screen, and to take into account other considerations as hereinafter described. I further contemplate the use of a foaming agent to promote light workability when used in sanded mortar, and raw gypsum to control the setting time, all as hereinafter described.

I have succeeded in producing a cementitious composition having slow-setting, high early and long time strength hydraulic properties together with plasticity and light workability in sanded mortar; the mixture having stability in its dry form and the capability of use over an extended period of time in its wet form without disagreeable lumping and stiffening from flash set. The comparative cost of manufacture is low and permits the utilization of inexpensive raw materials.

In the prior art, cementitious materials containing slag are well known. In many of these so called prior slag cements, the slag has been used as an aggregate and was not ground to the fineness of an impalpable flour, so that it was not intended to take advantage of the inherent hydraulic properties of such slag. In other proposals of the prior art where slag and cement have been finely ground for hydraulic purposes, it has been considered necessary to mix therewith a material such as lime to give it workability. The lime has been disadvantageous for the reason that it interfered with the strength and hydraulic capacity and its high water absorbing power or normal consistency ratio permits the mortar mix to freeze easily in cold weather. It has also been proposed to anneal slag prior to its incorporation in a slag cement, upon the fallacious theory that the reactivity is thereby affected. Experience has proved that the reactivity of slag is determined by its composition and granular size or fineness. I have found that basic slag, when ground fine, is rapidly reactive with calcium hydroxide of certain origin. When hydrolysis of cement takes place, calcium hydroxide is liberated and unites with the feebly basic constituent slag to form more basic compounds. The mono-calcium silicate of the slags, adds on calcium oxide from the calcium hydroxide liberated from the cement, to form di-calcium silicate, which is recognized as a cementitious compound giving long time strength. Thus the finely ground Portland cement, yielding calcium hydroxide in water solution upon hydrolysis, thereby avoiding the high water ratio necessary with the introduction of free extraneous lime, acts as an "energizer" to induce rapid development of improved hydraulic properties in the slag. The problem has been to utilize the vast quantities of furnace slag available and its desirable potential hydraulic properties in masonry and to overcome its highly disadvantageous non-plastic characteristics.

I have found that slag and Portland cement will react to produce compositions having desirable properties of strength, but that such compositions do not have the plasticity necessary for commercial and successful use. This is probably due to the dense glassy structure of slag which, while porous, prohibits any absorption of intergranular water films; the sharp hard edges of the slag particles increase the internal frictional resistance when manipulated in water admixture in mortar preparation.

It is well known, of course, that plasticity of Portland cement can be increased by fine grinding, but the problem of "flash set" is encountered very quickly. Fine grinding of a slag Portland cement mix, also increases plasticity and also unduly quickens the setting time so that flash setting will result.

It has been proposed to increase the plasticity of wall plasters and the like by using therein a mixture of clay or shale together with limes and waxy constituents. However, free lime, on account of its high normal consistency or water absorption ratio is detrimental to the cement strength development. Shales and clays have been considered undesirable additions that hinder the set hardening and development of strength of the resultant mixture in use. Shale has been defined as a consolidated laminated clay. For the most part, the prior art has indicated the use of shales and clays as aggregates or fillers. The number of species of clays are multitudinous, and the art has in most instances disregarded the characteristics which define clays from one another.

I have found that by using a definite type of raw plastic shale of low normal consistency or water ratio and finely grinding the slag-cement mixture with which it is incorporated that we obviate the disadvantages of the prior art. I have discovered that I can include shale of this type in a slag-cement composition, and contrary to what has commonly been supposed, maintain high strength in the composition together with easy workability, or plasticity. In other words it is possible to secure a highly plastic condition in an admixture of low water ratio constituents if the grinding is fine enough and the particular constituents are properly balanced, one against the other. Thus strength can be maintained together with plasticity. This discovery is primarily based upon the use of shale of a definite type and finely grinding the entire slag and cement clinker mixture containing this shale; it will be understood, however, that variations of the type of slag and cement clinker will necessitate slight changes in conditions. Prior art and field experience continuously reveals the general notion that plasticity increase must be at the sacrifice of strength in cements and vice versa.

I have discovered that all clays and corresponding shales will not act alike in the operation of my invention. I have found that the maintenance of high strength together with plasticity is dependent upon the use of a plastic argillaceous substance with a definite water ratio. For example, an argillaceous substance having a water ratio of 15 to 1 (that is, 100 grams of it will require 1500 grams of water to wet it up to a paste) will not give high strength in the final product. Such substances with very high water ratios are of the bentonite type. Highly plastic clay like ball, paper, and china clays usually have water ratios from 1 to 1 up to 2.5 or 3 to 1. Even these lowered water ratios preclude the addition of sufficient clay to produce a satisfactory plasticity and still maintain a satisfactory strength. Again, there are oil shales and clays which are not water plastic, due to the presence of bituminous matter which interferes with moisture absorption.

This failure of oil clays to plasticize with water prohibits their extremely fine dispersion and thus their subsequent efficiency in minimizing suction effect of masonry units, a function of plasticity that is necessary in mason's cement mortar. In the practice of my invention, I use a raw plastic clay or shale that, when ground, has a water ratio substantially less than 1 to 1, and grind the slag-cement-shale mixture to a fineness such that at least 95% of the same will pass through a 200 mesh screen. I also incorporate with the mixture of slag, cement clinker and shale, a gas entraining or foaming agent to give light workability to the mass when used in sanded mortar. For this ingredient, I prefer to use tank water or other organic wastage, such as glue, blood or animal refuse. It is well known to use organic retarders to delay the setting time of calcined gypsum plasters and the like. However, organic material is here used for a different purpose than as a retarder. It is used for effecting a light working mortar mixture which has a wealth of minute air bubbles. This incorporation of organic agent, and the subsequent entrainment of minute air bubbles as the sanded mortar is made, decreases the weight of the mortar, and the air bubbles reduce the internal friction when the harsh, sharp particles of the wet mortar slide over one another. This is highly desirable from the standpoint of the mason, as a heavy, short mortar is difficult to use successfully.

The organic tankage is added in sufficient amount to maintain entrained air bubbles only during the time the wet mortar is being worked and placed, consequently the bubbles break rapidly and expel the air, which substantially disappears before the time of setting commences, so that the resultant structure is back to its normal density and is non-porous. Thus by the use of air-entrainment the necessity for having a mortar of high water content to promote fluid working is obviated. Air is a fluid, but not permanent in the mortar mass, hence strength of the cementitious ingredients is not sacrificed in any way to gain workability in the mortar, as would be the case if a permanent high fluid ratio from water alone, was used.

It is my belief that fine grinding and aeration not only promote the plasticity of the mixture by increasing surface areas and thus filming areas, but also have a special effect on the shale with respect to the reaction and setting of slag and cement. I believe that fine grinding of the shale causes it to form a solid solution with the reaction product of slag and cement, and thus not only give up water for the hydration reaction, but to take part in the actual reaction itself, secondarily forming a solid solution. This theory accounts in part for the unexpected high strength obtained in the product when shale of definite water ratio is used accompanied by the aforesaid fine grinding.

Another component of the preferred mixture is gypsum. Raw gypsum is used to regulate the setting time, as is understood by those versed in the art.

A specific embodiment of my improved mortar cement is as follows:

| | Per cent |
|---|---|
| Slag | 54.1 |
| Portland cement clinker | 27.0 |
| Hard blue shale | 12.4 |
| Raw gypsum | 6.2 |
| Organic foaming agent | .3 |

This mixture is ground preferably to a fineness of 98% passing through a 200 mesh sieve.

The slag is a water granulated "basic," high calcium blast furnace slag with the following average analysis:

| | Per cent |
|---|---|
| SiO$_2$ | 35.50 |
| Fe$_2$O$_3$ | .92 |
| Al$_2$O$_3$ | 11.84 |
| CaO | 46.87 |
| MgO | 2.72 |
| Sulphur | 1.12 |
| MnO | 1.32 |

The Portland cement clinker has the following typical analysis:

| | Per cent |
|---|---|
| SiO$_2$ | 21.02 |
| Fe$_2$O$_3$ | 3.56 |
| Al$_2$O$_3$ | 6.80 |
| CaO | 67.03 |
| MgO | 1.20 |

The blue shale has the following typical analysis:

| | Per cent |
|---|---|
| SiO$_2$ | 56.12 |
| Fe$_2$O$_3$ | 8.73 |
| Al$_2$O$_3$ | 18.63 |
| CaO | 3.71 |
| MgO | .77 |
| Alkalies | 3.80 |
| Combined water | 8.20 |

The gypsum has the following typical analysis:

| | Per cent |
|---|---|
| SiO$_2$ | .32 |
| Fe$_2$O$_3$ | } .87 |
| Al$_2$O$_3$ | |
| CaO | 31.94 |
| MgO | .52 |
| SO$_3$ | 44.93 |
| Combined water | 20.95 |

The following is a typical analysis of the resulting mixture of slag, cement, shale, gypsum, and foaming agent:

| | Per cent |
|---|---|
| SiO$_2$ | 32.60 |
| Fe$_2$O$_3$ | 3.12 |
| Al$_2$O$_3$ | 10.28 |
| CaO | 45.80 |
| MgO | 2.17 |
| SO$_3$ | 2.52 |
| Mn | .66 |
| Ignition loss | 1.46 |

Physical characteristics, when tested by the methods prescribed by the American Society for Testing Materials for Portland Cement, are as follows:

| | |
|---|---|
| Initial set | 2 hrs. 30 min. |
| Final set | 5 hrs. 10 min. |
| Soundness | OK |

TENSILE STRENGTH—1-3 STANDARD MORTARS

*Pounds per sq. in.*

| 1 day | 2 days | 3 days | 7 days | 28 days | 3 mo. | 6 mo. |
|---|---|---|---|---|---|---|
| 106 | 150 | 223 | 328 | 414 | 512 | 565 |

COMRESSIVE STRENGTH—1-3 STANDARD MORTARS

*Pounds per sq. in.*

| day | 2 days | 3 days | 7 days | 28 days | 3 mo. | 6 mo. |
|---|---|---|---|---|---|---|
| 761 | 1243 | 1667 | 3058 | 4688 | 5624 | 6110 |

While I have indicated the specific details and analyses of the materials which go to make up the preferred embodiment, it is to be distinctly understood that I do not desire to be limited thereto, except as indicated in the appended claims.

I claim:

1. A mortar cement having hydraulic characteristics comprising a mixture of basic slag, cement clinker, and shale ground to a fineness of more than 95% passing through a 200 mesh screen, the ingredients being in such proportions as to give a troweling plasticity in cement mixtures without using free lime.

2. A new manufacture comprising a pulverized mixture of a fineness exceeding 95% passing through a 200 mesh screen containing a substantially cellular slag having slow setting hydraulic characteristics, a substantially amorphous tricalcium silicate having rapid setting hydraulic characteristics, and a substantially laminated aluminum silicate having water-plastic characteristics, the ingredients being in such proportions as to give a troweling plasticity in cement mixtures without using free lime.

3. A cement mixture ground to a fineness exceeding 95%, passing through a 200 mesh screen comprising non-plastic slag material capable of reacting with cement clinker to form dicalcium silicate, cement clinker, and a plastic shale having a water ratio lying below the water ratio of china clays, paper clays, ball clays and the like, the ingredients being in such proportions as to give a troweling plasticity in cement mixtures without using free lime.

4. A finely ground hydraulic cement mixture comprising slag, Portland cement clinker and shale, the slag being sufficiently fine to be reactive with water, the cement clinker being sufficiently fine to possess high early strength characteristics, and the shale having a water-ratio sufficient to permit the slag and cement clinker to react properly when in use, the ingredients being in such proportions as to give a troweling plasticity in cement mixtures without using free lime.

5. A finely ground hydraulic cement mixture having slow setting high early and long time strength characteristics comprising non-plastic slag in predominant amount, Portland cement clinker in lesser amount than slag, and shale in lesser amount than cement clinker, the amount of shale being sufficient to render the mass plastic without disturbing the hydraulic or strength characteristics of the mixture, the ingredients being in such proportions as to give a troweling plasticity in cement mixtures without using free lime.

6. A hydraulic mortar cement comprising a cellular nonplastic slag in predominant amount, Portland cement clinker, and a lamellar plasticizing shale sufficient in amount to give the mixture workability when mixed with water and to serve as a reservoir for the proper development of hydraulic characteristics, the ingredients being in such proportions as to give a troweling plasticity in cement mixtures without using free lime.

7. A cement mixture having hydraulic characteristics consisting of slag, Portland cement clinker, shale, gypsum and a foaming agent sufficient in amount to give light workability in use, the ingredients being in such proportions as to give a troweling plasticity in cement mixtures without using free lime.

8. A hydraulic cement comprising slag, cement clinker, shale and gypsum ground to a fineness exceeding 95% passing through a 200 mesh screen, the ingredients being in such proportions as to give a troweling plasticity in cement mixtures without using free lime.

9. A hydraulic cement comprising slag, cement clinker, shale, gypsum, and a foaming agent, all ground to a fineness exceeding 95% passing through a 200 mesh screen, the ingredients being in such proportions as to give a troweling plasticity in cement mixtures without using free lime.

10. A hydraulic cement comprising slag, cement clinker, shale, and a foaming agent, all ground to a fineness exceeding 95% passing through a 200 mesh screen, the ingredients being in such proportions as to give a troweling plasticity in cement mixtures without using free lime.

11. A mortar cement comprising a finely ground mixture of cellular slag substance having hydraulic properties and capable of developing long-time strength, hydraulic cement capable of developing early strength, and a clayey plasticizing substance having a low coefficient of shrinkage and capable of holding sufficient water adequate for the formation of hydraulic compounds with the hydraulic components, the ingredients being in such proportions as to give a troweling plasticity in cement mixtures without using free lime.

12. A mortar cement comprising a finely ground mixture of porous slag substance having hydraulic properties and capable of developing long-time strength, hydraulic cement capable of developing high early strength, and a clay having a low coefficient of shrinkage and a water ratio below 1 to 1, the ingredients being in such proportions as to give a troweling plasticity in cement mixtures without using free lime.

13. As a new product, a mortar cement comprising slag, cement and shale having a one-day tensile strength of over 100 lbs. per square inch and a 3 month tensile strength of over 500 lbs. per square inch, the ingredients being in such proportions as to give a troweling plasticity in cement mixtures without using free lime.

14. A motar cement comprising slag, cement and shale having a one-day compressive strength of over 700 lbs. per square inch and a 3 months compressive strength of over 5000 lbs. per square inch, the ingredients being in such proportions as to give a troweling plasticity in cement mixtures without using free lime.

15. A new product comprising a mortar cement containing slag, cement and shale having a one-day tensile strength of over 100 lbs. per square inch and a one-day compressive strength of over 700 lbs. per square inch, the ingredients being in such proportions as to give a troweling plasticity in cement mixtures without using free lime.

16. The process of making a mortar cement having high early and long-time strengths and plastic workability which comprises grinding a mixture of slag, cement clinker, and shale to a fineness such that at least 95% will pass through a 200 mesh sieve.

17. A slag mortar cement comprising granulated basis slag, Portland cement clinker, and hydrous shale, the ingredients being in such proportions as to give a troweling plasticity in cement mixtures without using free lime.

18. A finely ground plastic slag mortar cement comprising granulated slag, cement, hydrous clay, gypsum, and an organic agent capable of inducing air entrainment to form minute bubbles during sanded mortar preparation and use, the ingredients being in such proportions as to give a troweling plasticity in cement mixtures without using free lime.

In testimony whereof I have hereunto set my hand.

ORIE E. WASSON.